United States Patent
Mohrlock

(10) Patent No.: US 12,194,804 B2
(45) Date of Patent: Jan. 14, 2025

(54) WHEEL SUSPENSION FOR A WHEEL OF AN AXLE OF A MOTOR VEHICLE AND MOTOR VEHICLE

(71) Applicant: AUDI AG, Ingolstadt (DE)

(72) Inventor: Dominik Mohrlock, Buxheim (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 18/440,121

(22) Filed: Feb. 13, 2024

(65) Prior Publication Data

US 2024/0317004 A1 Sep. 26, 2024

(30) Foreign Application Priority Data

Mar. 21, 2023 (DE) .......................... 102023107011.8

(51) Int. Cl.
*B60G 3/20* (2006.01)

(52) U.S. Cl.
CPC .......... *B60G 3/20* (2013.01); *B60G 2200/144* (2013.01); *B60G 2200/156* (2013.01); *B60G 2200/17* (2013.01); *B60G 2204/148* (2013.01); *B60G 2204/416* (2013.01)

(58) Field of Classification Search
CPC ................ B60G 3/20; B60G 2200/144; B60G 2200/156; B60G 2200/17; B60G 2204/148; B60G 2204/416
See application file for complete search history.

(56) References Cited

U.S. PATENT DOCUMENTS

| | | | | |
|---|---|---|---|---|
| 2,544,331 A | * | 3/1951 | Kogstrom .............. | B62D 17/00 280/86.757 |
| 3,273,909 A | * | 9/1966 | Muller ................ | F16C 11/0619 403/138 |
| 5,062,655 A | * | 11/1991 | Sommerer ............. | B60G 7/005 403/56 |
| 5,362,093 A | * | 11/1994 | Klosterhuber ...... | F16C 11/0619 280/124.136 |

(Continued)

FOREIGN PATENT DOCUMENTS

| | | |
|---|---|---|
| DE | 1848100 U | 3/1962 |
| DE | 4224895 A1 | 2/1994 |

(Continued)

OTHER PUBLICATIONS

Search Report issued on Jan. 12, 2024 in corresponding German application No. 102023107011.8; 16 pages.

(Continued)

*Primary Examiner* — Faye M Fleming
(74) *Attorney, Agent, or Firm* — Maier & Maier, PLLC

(57) ABSTRACT

A wheel suspension for a wheel of an axle of a motor vehicle, including a pivot bearing supporting the wheel, which is articulated in an upper link level via at least one link on the motor vehicle body. The pivot bearing includes a pivot bearing arm on which the link is mounted by a ball joint having a ball pin, the ball pin is aligned extending in the vertical direction of the vehicle and the ball of the ball pin is received in a receptacle on the link side and the shaft of the ball pin is received in a receptacle on the pivot bearing arm side. The receptacle on the pivot bearing arm side is formed as a longitudinally slotted clamping hole.

15 Claims, 2 Drawing Sheets

(56) References Cited

U.S. PATENT DOCUMENTS

| | | | |
|---|---|---|---|
| 7,322,591 B2 * | 1/2008 | Seki .................... | B60G 21/0551 |
| | | | 280/124.152 |
| 7,384,053 B1 * | 6/2008 | Boecker ............. | B60G 21/0551 |
| | | | 280/124.152 |
| 8,757,648 B1 | 6/2014 | Winter | |

FOREIGN PATENT DOCUMENTS

| | | |
|---|---|---|
| DE | 4244886 C2 | 2/1996 |
| DE | 19847356 A1 | 4/1999 |
| DE | 10327554 A1 | 1/2005 |
| DE | 102005011135 A1 | 9/2005 |
| DE | 102015014027 A1 | 5/2017 |
| DE | 102021130060 A1 | 8/2022 |
| EP | 3017988 B1 | 3/2018 |
| FR | 2129902 A1 | 11/1972 |
| FR | 2517388 A1 | 6/1983 |
| JP | 2015013528 A | 1/2015 |
| WO | 2017/118518 A1 | 7/2017 |

OTHER PUBLICATIONS

Search Report issued on Jul. 24, 2024, in corresponding European Application No. 24154780.1, 20 pages.

* cited by examiner

WHEEL SUSPENSION FOR A WHEEL OF AN AXLE OF A MOTOR VEHICLE AND MOTOR VEHICLE

FIELD

The invention relates to a wheel suspension for a wheel of an axle of a motor vehicle and to a motor vehicle.

BACKGROUND

In motor vehicles having internal combustion engines, the height of the hood or the height profile of the hood is determined in particular by the internal combustion engine. I.e., the wheel suspension, which has a similar height to the internal combustion engine, does not generally determine the height of the hood in motor vehicles having internal combustion engines. In the course of the changeover of motor vehicles to electric drives, the wheel suspension will increasingly determine the course of the hood due to the higher weight of electric vehicles and the greater vehicle heights of electric vehicles due to the batteries installed in the vehicle floor.

A generic wheel suspension for a wheel of an axle of a motor vehicle, according to which a pivot bearing supporting the wheel comprises a pivot bearing arm on which the links of the upper link level are each mounted by means of a ball joint, and according to which the ball pins of the ball joints are each aligned extending in the vehicle vertical direction, the z direction, and the shafts of the ball pins on the pivot bearing arm side are each received in a longitudinally slotted clamping hole and held clamped by means of a clamping screw aligned orthogonally to the longitudinal axis of the clamping hole, can be inferred from the disclosure of DE 10 2015 014 027 A1, cf. FIG. 1, [0005].

SUMMARY

The invention is based on the object of refining a wheel suspension in such a way that the wheel suspension is not as tall.

In a known manner, the wheel suspension for a wheel of an axle of a motor vehicle comprises a pivot bearing that supports the wheel and is articulated in an upper link level via at least one link on the motor vehicle body, wherein the pivot bearing comprises a pivot bearing arm on which the link is mounted by means of a ball joint having a ball pin. The ball pin of the ball joint, which is aligned extending in the vehicle vertical direction z, comprises in a known manner a ball mounted in a receptacle on the link side and a shaft received in a receptacle on the pivot bearing arm side, wherein the receptacle on the pivot bearing arm side is designed as a longitudinally slotted clamping hole in which the shaft of the ball pin is held clamped by means of a clamping screw aligned orthogonally to the longitudinal axis L of the clamping hole and orthogonally to the longitudinal slot of the clamping hole.

Solely for the sake of completeness, it is to be noted that the direction specifications used above and below relate to a vehicle-fixed coordinate system, the x axis of which extends along the longitudinal axis of the vehicle and points in the direction of travel (=forward direction of travel), the y axis of which extends along the transverse axis of the vehicle and—accordingly—points to the left, and the z axis of which is aligned upwards along the vehicle vertical axis. According to the invention, the clamping hole is arranged inclined inwards towards the vehicle center in the vehicle transverse direction y, so that the ball pin received in the clamping hole is aligned—starting from the vertical direction—inclined inwards by an acute angle β. In other words, the upper part of the ball pin viewed in the z direction, i.e., the ball, is arranged starting from the vertical lying inwards towards the center of the vehicle and correspondingly the end of the ball pin facing away from the ball is arranged starting from the vertical lying outwards towards the wheel.

The design according to the invention has the effect that—since the ball of the ball pin not only undergoes a displacement inward in the vehicle transverse direction y but also a deflection downward in the vehicle vertical direction z—the axle height is reduced and structure of the wheel suspension is therefore not as tall. A further effect of the design according to the invention is that the ball of the ball pin received in the link-side receptacle is deflected upwards less in the z direction during full deflection. The passage in the strut dome can therefore advantageously be made smaller, which in turn has an advantageous effect on the strength.

The clamping hole is preferably arranged extending so that the following applies to the acute angle β: 10°≤angle β≤20°. The specified angle range, namely 10°≤angle β≤20°, proves to be particularly advantageous because with good kinematics a sufficient reduction of the axle height is already ensured.

A particularly preferred embodiment of the invention provides that the pivot bearing arm, viewed in the vehicle vertical direction z, extends upwards above the wheel and—in the construction position of the motor vehicle—viewed in the vehicle transverse direction y, extends up to the tread of the wheel or in some areas extends into the tread of the wheel and that the ball joint is arranged lying above the wheel and is positioned and designed so that in the construction position of the motor vehicle the ball of the ball pin—when viewed in projection onto the roadway—lies outside the tread of the wheel.

In the present case, the construction position of the motor vehicle is to be understood as the state of the motor vehicle when stationary, i.e., the wheels are in a defined, slightly deflected state caused by the normal weight.

The advantage of this design is that, since in the construction position the ball of the ball pin—when viewed in projection onto the roadway—lies outside the tread of the wheel, the distance between the pivot bearing arm and the wheel arch required for clearance can be dimensioned smaller, which in turn has a positive effect on the height profile of the hood.

The pivot bearing arm is preferably designed to be gooseneck-shaped. The advantage of this design is that the alignment of the clamping hole, which is inclined inwards towards the center of the vehicle in the transverse direction y of the vehicle—as a result of the curvature—enables an increased displacement of the ball of the ball pin downwards in the z direction, which in turn saves installation space height.

A further embodiment provides that the shaft of the ball pin has a circumferential groove and that the clamping screw hole receiving the clamping screw is aligned extending tangentially to the clamping hole in such a way that the clamping screw partially extends into the groove formed on the shaft of the ball pin. The advantage of this design is that, due to the form fit, the ball pin is now held captively in the clamping hole.

Since a spring strut of a wheel suspension is known to contribute significantly to the height of the wheel suspension, a further advantageous refinement of the wheel suspension according to the invention provides—to additionally reduce the overall height of the wheel suspension—arranging the spring strut skewed in relation to the axis of rotation of the wheel.

A particularly compact embodiment of the wheel suspension according to the invention is characterized in that the pivot bearing in the upper link level is articulated to the motor vehicle body via a single link designed as a wishbone.

An alternative embodiment provides that the pivot bearing is articulated to the motor vehicle body via two rod-shaped wishbones, each of which is mounted on the pivot bearing arm via a ball joint. I.e., the balls of the two ball pins are each accommodated in corresponding receptacles on the link side and the shafts of the ball pins are accommodated in corresponding clamping holes on the pivot bearing arm side. The shafts are preferably fastened or clamped in the holes on the pivot bearing arm side by means of two clamping screws, which are aligned flush with one another and orthogonal to the longitudinal axis of the ball pins.

To reduce the number of loose parts, an alternative embodiment provides that the two shafts are held clamped in the clamping holes on the pivot bearing arm side via a common clamping screw aligned orthogonally to the longitudinal axis of the shafts.

The invention is also based on the object of refining a motor vehicle whose wheels are articulated on the body side via wheel suspensions in such a way that a profile of the engine hoods which is not as tall or flatter is made possible.

All embodiments of the wheel suspension according to the invention may be transferred analogously to the motor vehicle according to the invention, so that the above-mentioned advantages can also be achieved thereby.

BRIEF DESCRIPTION OF THE FIGURES

Further advantages and possible applications of the invention will be apparent from the following description in conjunction with the exemplary embodiment illustrated in the drawing.

In the figures.

DETAILED DESCRIPTION

Figure 1:
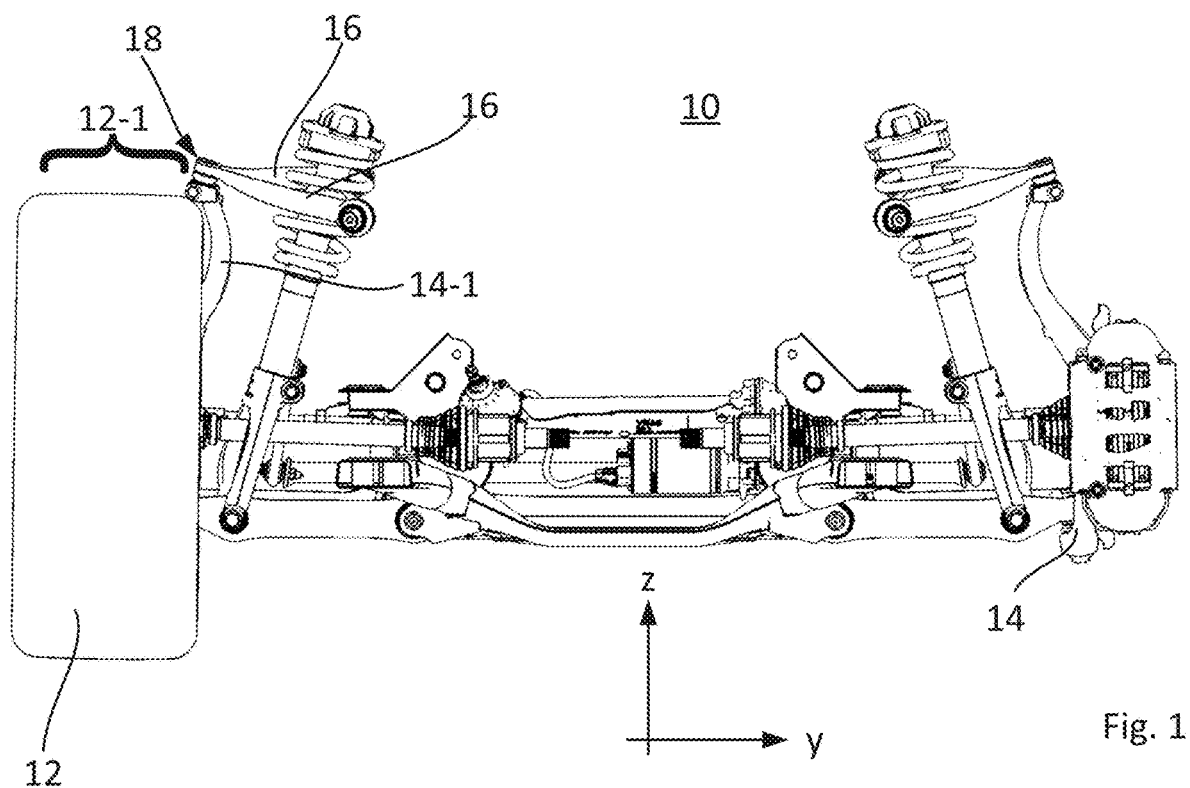
FIG. 1 shows a wheel suspension according to the invention for a front wheel of a motor vehicle in the construction position in a view from behind.
Figure 2:
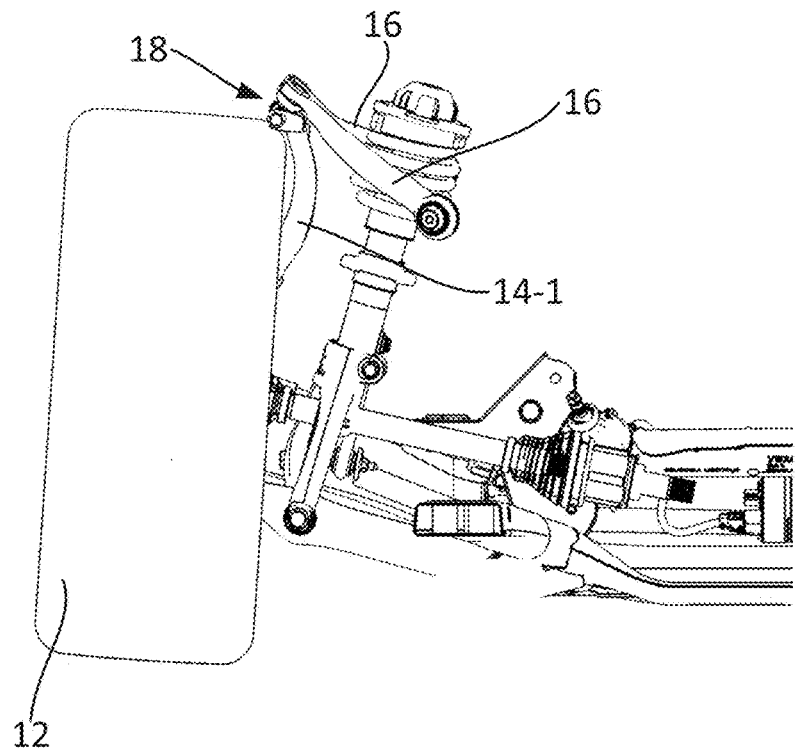
FIG. 2 shows the wheel suspension from FIG. 1 in the fully deflected state.

FIG. 1 and FIG. 2 show a wheel suspension according to the invention, designated overall by reference number 10, for a wheel 12 of a motor vehicle. While FIG. 1 shows the wheel suspension 10 in the construction position of the motor vehicle, i.e., in a defined, slightly deflected state, in FIG. 2 the wheel suspension 10 is shown in the fully deflected state.

As FIG. 1 and FIG. 2 furthermore show, the wheel suspension 10 comprises a pivot bearing 14 which supports the wheel 12 and is articulated on the body side in the upper link level via two links 16. A description of the mounting of the pivot bearing 14 in the lower link level is omitted here, as this is not necessary for understanding the invention.

As can furthermore be seen in FIG. 1 and FIG. 2, the swivel bearing 14 has a gooseneck-shaped swivel bearing arm 14-1, which extends over the wheel 12 in the vehicle vertical direction z and which—as shown in FIG. 1—in the construction position extends in the vehicle transverse direction y outwards, to the tread 12-1 of the wheel 12.

In the present case, the links 16 are each mounted on the gooseneck-shaped pivot bearing arm 14-1 of the pivot bearing 14 via a ball joint, designated overall by reference sign 18.

Figure 3:
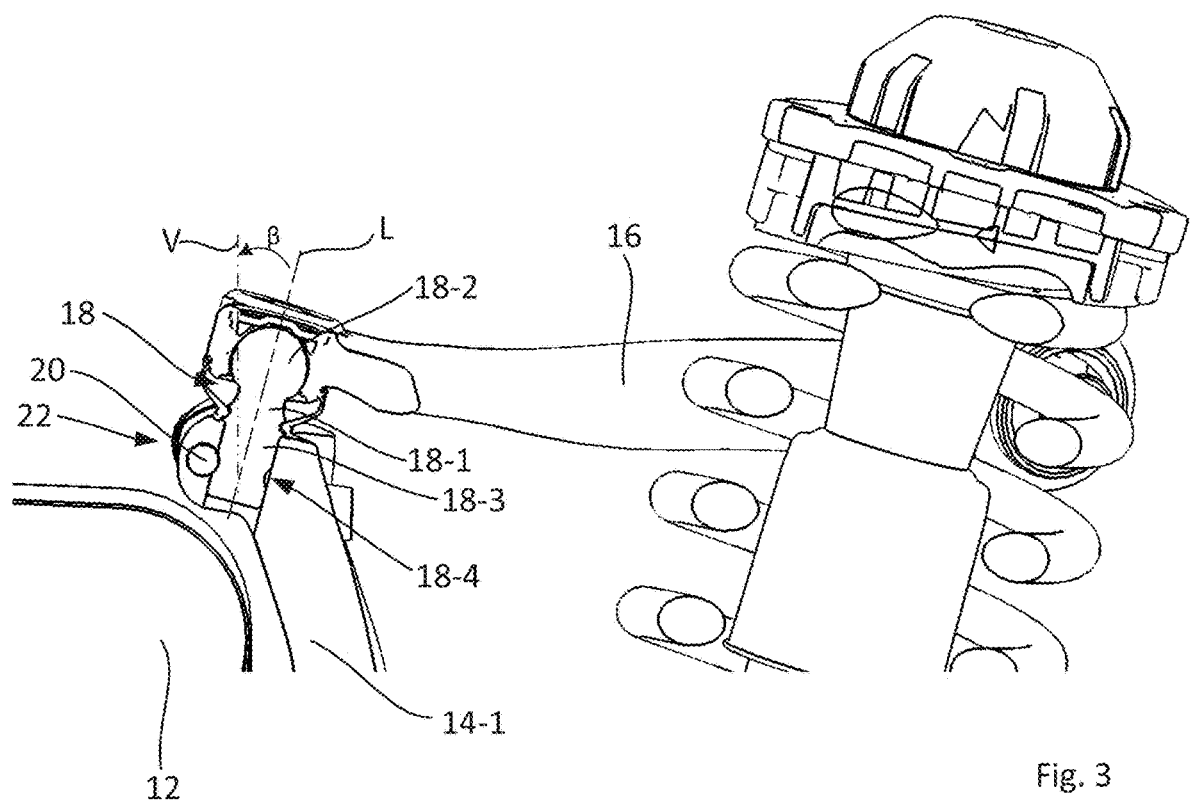
FIG. 3 shows an enlarged detail of the wheel suspension from FIG. 1 and FIG. 2 in a sectional view.

For this purpose, the ball joint 18, as can be seen in particular from FIG. 3, essentially comprises a ball pin 18-1, the balls 18-2 of which are each received in an articulated manner in correspondingly formed link-side receptacles of the links 16, and the shafts 18-3 of which are each received in longitudinally slotted clamping holes on the pivot bearing arm side and are held clamped in the clamping hole by means of a clamping screw 20. In the present case, only one clamping screw 20 is provided, which—as can be seen from FIG. 3—is aligned extending orthogonally to the longitudinal direction L of the clamping hole and orthogonally to the slots 22 of the clamping hole.

The wheel suspension according to the invention is characterized in that, as is apparent from FIG. 3 in particular, the clamping hole is aligned extending inclined inwards towards the vehicle center in the vehicle transverse direction y, so that the ball pin 18-1 received in the clamping hole is aligned—starting from the vertical direction designated by the reference sign V—inclined inwards by an acute angle β, in the present case by β=15°.

As a result, the ball 18-2 of the ball pin 18-1 undergoes not only an inward displacement in the vehicle transverse direction y, but also a downward displacement in the vehicle vertical direction z, so that structure of the wheel suspension 10 is not as tall.

In order to ensure a captive hold of the ball pin 18-1 in the clamping hole, as can be seen from FIG. 3, the shaft 18-3 of the ball pin 18-1 has a circumferential groove 18-4 and the clamping screw hole receiving the clamping screw 20 is aligned extending tangentially to the clamping hole such that the clamping screw 20 partially extends into the groove 18-4 formed on the shaft 18-3 of the ball pin 18-1 and therefore has a form fit with the ball pin 18-1.

The invention claimed is:

1. A wheel suspension for a wheel of an axle of a motor vehicle, comprising a pivot bearing supporting the wheel, which bearing is articulated in an upper link level via at least one link on the motor vehicle body, wherein the pivot bearing comprises a pivot bearing arm on which the link is mounted by means of a ball joint having a ball pin, wherein the ball pin is aligned extending in the vertical direction of the vehicle and the ball of the ball pin is received in a receptacle on the link side and the shaft of the ball pin is received in a receptacle on the pivot bearing arm side, wherein the receptacle on the pivot bearing arm side is formed as a longitudinally slotted clamping hole, in which the shaft of the ball pin is held clamped by means of a clamping screw aligned orthogonally to the longitudinal axis of the clamping hole, wherein the clamping hole is arranged inclined inwards towards the vehicle center in the vehicle transverse direction, so that the ball pin received in the clamping hole is aligned so as to be inclined inwards from the vertical direction by an acute angle.

2. The wheel suspension according to claim 1, wherein the clamping hole is arranged extending so that the following applies to the acute angle (β): 10°≤angle (β)≤20°.

3. The wheel suspension according to claim 1, wherein the pivot bearing arm, viewed in the vehicle vertical direction, extends upwards above the wheel, wherein the pivot bearing arm, in the construction position of the motor vehicle, viewed in the vehicle transverse direction, extends to the tread of the wheel, and wherein the ball joint is arranged lying above the wheel and is positioned and designed so that the ball of the ball pin lies outside the tread of the wheel.

4. The wheel suspension according to claim 3, wherein the pivot bearing arm of the pivot bearing is designed to be gooseneck-shaped.

5. The wheel suspension according to claim 1, wherein the shaft of the ball pin has a circumferential groove and in that the clamping screw hole receiving the clamping screw is aligned extending tangentially to the clamping hole in such a way that the clamping screw partially extends into the groove formed on the shaft of the ball pin.

6. The wheel suspension according to claim 1, wherein a spring strut of the wheel suspension is arranged skewed to the axis of rotation of the wheel.

7. The wheel suspension according to claim 1, wherein the pivot bearing is articulated in the upper link level on the motor vehicle body via a link designed as a wishbone.

8. The wheel suspension according to claim 1, wherein the pivot bearing is articulated in the upper link level via two rod-shaped wishbones on the motor vehicle body, each of which is mounted on the pivot bearing arm via a ball joint, wherein the balls of the ball pin are each received in receptacles on the link side and the shafts of the ball pins are each received in clamping holes on the pivot bearing arm side, wherein the shafts are held clamped in clamping holes on the pivot bearing arm side via two clamping screws aligned flush.

9. The wheel suspension according to claim 1, wherein the pivot bearing is articulated in the upper link level via two rod-shaped wishbones on the motor vehicle body, each of which is mounted on the pivot bearing arm via a ball joint, wherein the balls of the ball pin are each received in receptacles on the link side and the shafts of the ball pins are each received in clamping holes on the pivot bearing arm side, wherein the shafts are held clamped in clamping holes on the pivot bearing arm side via one common clamping screw.

10. A motor vehicle, the wheels of which are articulated on the body side via wheel suspensions, wherein the wheel suspensions of the front wheels are designed according to claim 1.

11. The wheel suspension according to claim 2, wherein the pivot bearing arm, viewed in the vehicle vertical direction, extends upwards above the wheel, wherein the pivot bearing arm, in the construction position of the motor vehicle, viewed in the vehicle transverse direction, extends to the tread of the wheel, and wherein the ball joint is arranged lying above the wheel and is positioned and designed so that the ball of the ball pin lies outside the tread of the wheel.

12. The wheel suspension according to claim 2, wherein a spring strut of the wheel suspension is arranged skewed to the axis of rotation of the wheel.

13. The wheel suspension according to claim 3, wherein a spring strut of the wheel suspension is arranged skewed to the axis of rotation of the wheel.

14. The wheel suspension according to claim 4, wherein a spring strut of the wheel suspension is arranged skewed to the axis of rotation of the wheel.

15. The wheel suspension according to claim 5, wherein a spring strut of the wheel suspension is arranged skewed to the axis of rotation of the wheel.

* * * * *